US009015795B2

(12) United States Patent
B'Far et al.

(10) Patent No.: US 9,015,795 B2
(45) Date of Patent: Apr. 21, 2015

(54) REPUTATION-BASED AUDITING OF ENTERPRISE APPLICATION AUTHORIZATION MODELS

(71) Applicant: Oracle International Corporation, Redwood Shores, CA (US)

(72) Inventors: Reza B'Far, Huntington Beach, CA (US); Kent Spaulding, Portland, OR (US); Yasin Cengiz, Irvine, CA (US); Americo Caves, Irvine, CA (US); Paiting Ou, Irvine, CA (US); Christopher Hluchan, Glendale, CO (US); Venkata Sree Ramya Manchikanti, Irvine, CA (US)

(73) Assignee: Oracle International Corporation, Redwood Shores, CA (US)

( * ) Notice: Subject to any disclaimer, the term of this patent is extended or adjusted under 35 U.S.C. 154(b) by 10 days.

(21) Appl. No.: 13/932,265

(22) Filed: Jul. 1, 2013

(65) Prior Publication Data
US 2014/0075500 A1    Mar. 13, 2014

Related U.S. Application Data

(60) Provisional application No. 61/699,238, filed on Sep. 10, 2012.

(51) Int. Cl.
*H04L 29/06*    (2006.01)

(52) U.S. Cl.
CPC .............. *H04L 63/20* (2013.01); *H04L 63/102* (2013.01)

(58) Field of Classification Search
CPC ...... G06Q 10/06; G06Q 40/025; H04L 63/20; H04L 63/102; H04W 12/02; H04W 12/12

USPC .................. 726/1; 705/7.28, 7.38, 7.39, 7.42; 455/411
See application file for complete search history.

(56) References Cited

U.S. PATENT DOCUMENTS

| | | | |
|---|---|---|---|
| 7,324,954 B2 | 1/2008 | Calderaro et al. | |
| 7,945,586 B1 | 5/2011 | Fang et al. | |
| 8,205,239 B1* | 6/2012 | Satish | 726/1 |
| 8,812,342 B2 | 8/2014 | Barcelo et al. | |
| 8,826,426 B1* | 9/2014 | Dubey | 726/22 |
| 2007/0208869 A1* | 9/2007 | Adelman et al. | 709/229 |
| 2008/0005778 A1 | 1/2008 | Chen et al. | |
| 2008/0109244 A1* | 5/2008 | Gupta | 705/1 |
| 2010/0106557 A1* | 4/2010 | Buss | 705/10 |
| 2010/0125911 A1 | 5/2010 | Bhaskaran | |
| 2011/0219424 A1 | 9/2011 | Panasyuk et al. | |
| 2013/0179215 A1* | 7/2013 | Foster et al. | 705/7.28 |

(Continued)

OTHER PUBLICATIONS

Krautsevich (2010). Usage Control, Risk and Trust. 7th International Conference, TrustBus 2010, Bilbao, Spain Aug. 30-31, 2010.*

(Continued)

*Primary Examiner* — Brian Shaw
(74) *Attorney, Agent, or Firm* — Kilpatrick Townsend & Stockton LLP

(57) ABSTRACT

Reputation metrics are used to gauge risk of individuals to an organization, such as employees of a business. The reputation metrics may be calculated from both internal and external data sources, including social network profiles of the individuals. Calculations of risk are used to make determinations regarding the activities the individuals are authorized to engage in.

17 Claims, 5 Drawing Sheets

(56) References Cited

U.S. PATENT DOCUMENTS

| | | |
|---|---|---|
| 2013/0297373 A1 | 11/2013 | Proux |
| 2014/0074547 A1 | 3/2014 | B'Far et al. |
| 2014/0074560 A1 | 3/2014 | B'Far et al. |
| 2014/0074928 A1 | 3/2014 | B'Far et al. |

OTHER PUBLICATIONS

Chen (2011). Risk-Aware Role-Based Access Control. 7th International Workshop, STM 2011, Copenhagen, Denmark, Jun. 27-28, 2011.*

U.S. Appl. No. 13/932,286, Non-Final Office Action mailed on Oct. 1, 2014, 13 pages.

* cited by examiner

REPUTATION-BASED AUDITING OF ENTERPRISE APPLICATION AUTHORIZATION MODELS

CROSS-REFERENCES TO RELATED APPLICATIONS

The present application claims benefit under 35 USC 119(e) of U.S. Provisional Application No. 61/699,238, filed on Sep. 10, 2012 by B'Far et al. and entitled "Reputation-Based Auditing of Enterprise Application Authorization Models," of which the entire disclosure is incorporated herein by reference for all purposes.

The present application is also related to the following co-pending and commonly assigned U.S. patent applications:

U.S. patent application Ser. No. 13/935,304 filed concurrent herewith by B'Far et al. and entitled "Advanced Skill Match and Reputation Management for Workforces," and which claims priority to U.S. Provisional Application No. 61/699,233, filed on Sep. 10, 2012 by B'Far et al. and entitled "Advanced Skill Match and Reputation Management for Workforces";

U.S. patent application Ser. No. 13/932,286 filed concurrent herewith by B'Far et al. and entitled "Personal and Workforce Reputation Provenance in Applications," and which claims priority to U.S. Provisional Application No. 61/699,250, filed on Sep. 10, 2012 by B'Far et al. and entitled "Personal and Workforce Reputation Provenance in Applications;" and U.S. patent application Ser. No. 13/932,269 filed concurrent herewith by B'Far et al. and entitled "Semi-Supervised Identity Aggregation of Profiles Using Statistical Methods," and which claims priority to U.S. Provisional Application No. 61/699,243, filed on Sep. 10, 2012 by B'Far et al. and entitled "Semi-Supervised Identity Aggregation of Profiles Using Statistical Methods," of which the entire disclosure of each is incorporated herein by reference for all purposes.

BACKGROUND OF THE INVENTION

Modern communications technologies provide numerous opportunities for individuals and organizations to communicate with others in electronic environments. Social networks, for example, allow individual organizations to communicate with groups of individuals and even the general public. Web sites and other electronic information resources often allow members of the public to provide their own content, such as product reviews, opinions on certain topics, technical assistance, photographs, audio files, video files, and other types of content. In addition, the diverse ways in which modern communication technologies operate provide opportunities to gain valuable intelligence that would not otherwise be as freely available. For instance, social networks often allow users to mutually associate themselves with one another. This allows, for example, the collection of information not only about an individual, but other individuals who have some sort of relationship with the individual. As such, effective use of such communications have the potential to have significant positive effects for the conduct of one's business.

At the same time, the ability to freely communicate using modern technologies has the potential to cause significant harmful effects on one's business. For instance, the conduct of an individual in a public forum can shape others' opinion of an organization associated with the individual. While this can be a positive effect in many instances, unsavory and/or unpopular behavior of the individual can negatively affect the organization. For instance, if an employee of a company uses excessive amounts of profanity and provides negative opinions of his or her employer in public forums, the company can suffer reputational harm, thereby affecting the company's good will with the general public. As another example, if the employee publicly posts information related to confidential dealings of the company, the company can find itself addressing various legal issues, such as securities laws violations. Thus, while modern communications provide numerous opportunities for an organization, such opportunities are not without significant risks.

BRIEF SUMMARY OF THE INVENTION

Embodiments of the invention provide systems and methods for reputation-based auditing of enterprise application authorized models. Reputation metrics can be used to gauge risk of individuals to an organization, such as employees of a business. The reputation metrics may be calculated from both internal and external data sources, including social network profiles of the individuals. Calculations of risk can be used to make determinations regarding the activities the individuals are authorized to engage in.

Stated another way, managing authorization policies of an enterprise based on reputation auditing of employees of the enterprise can comprise obtaining information associated with an employee of the enterprise from each of a plurality of data sources. The plurality of data sources can include at least one data source internal to the enterprise and at least one data source external to the enterprise. Stored reputation information for the employee can be accessed, the reputation information including one or more reputation metrics. The one or more reputation metrics can indicate an influence of the employee to a risk to the enterprise associated with the employee. The one or more reputation metrics for the employee can be updated based on the obtained information and a determination can be made as to whether to update one or more authorization policies of the enterprise based at least in part on the updated one or more reputation metrics for the employee. The one or more authorization policies of the enterprise can be updated based at least in part on the updated one or more reputation metrics for the employee. For example, updating the one or more authorization policies of the enterprise based at least in part on the updated one or more reputation metrics for the employee can comprise increasing an amount of activities in which the employee is allowed to engage when updating the one or more reputation metrics for the employee based on the obtained information results in an increase in the one or more reputation metrics. Additionally or alternatively, updating the one or more authorization policies of the enterprise based at least in part on the updated one or more reputation metrics for the employee can comprise decreasing an amount of activities in which the employee is allowed to engage when updating the one or more reputation metrics for the employee based on the obtained information results in a decrease in the one or more reputation metrics.

According to one embodiment, determining whether to update one or more authorization policies of the enterprise based at least in part on the updated one or more reputation metrics for the employee can comprise calculating a risk score for the employee using the stored one or more reputation metrics, calculating a risk score for the employee using the updated one or more reputation metrics, comparing the risk score calculated using the stored one or more reputation metrics and the risk score calculated using the updated one or more reputation metrics, and determining to update the one or more authorization policies of the enterprise when said comparing indicates a change in the risk scores that exceeds a threshold amount. Additionally or alternatively, determining whether to update one or more authorization policies of the enterprise based at least in part on the updated one or more reputation metrics for the employee can comprise calculating a risk score for the employee using the stored one or more reputation metrics, calculating a risk score for the employee using the updated one or more reputation metrics, making a numerical estimate of a derivative of the risk score calculated using the stored one or more reputation metrics and the risk score calculated using the updated one or more reputation metrics, and determining to update the one or more authorization policies of the enterprise when the numerical estimate of the derivative of the risk scores indicates a change in the risk scores that exceeds a threshold amount. According to yet another embodiment, determining whether to update one or more authorization policies of the enterprise based at least in part on the updated one or more reputation metrics for the employee can additionally or alternatively comprise generating a user interface including an indication of a change in risk associated with the employee based on updating the one or more reputation metrics for the employee, presenting the user interface to a user, receiving from the user through the user interface an indication of an update to the authorization policies of the enterprise, and updating the one or more authorization policies of the enterprise based at least in part on the received indication. Additionally or alternatively, determining whether to update one or more authorization policies of the enterprise based at least in part on the updated one or more reputation metrics for the employee can comprise accessing a credit score of the employee and calculating at least one of the one or more reputation metrics based on the credit score of the employee.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
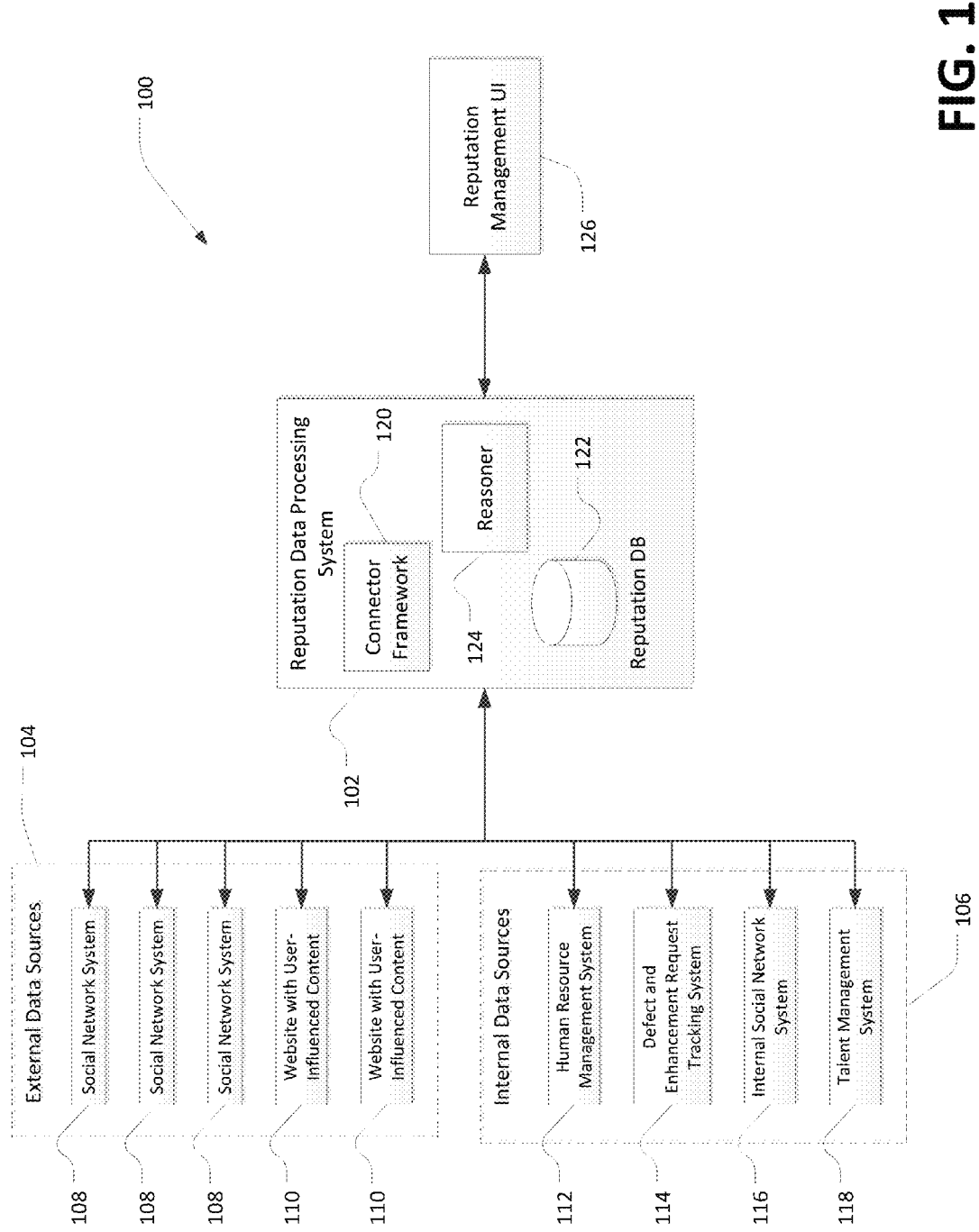
FIG. 1 shows an illustrative example of an environment in which various embodiments of the present disclosure may be practiced.

FIG. 1 shows an illustrative example of an environment 100 in which various embodiments of the present disclosure may be practiced. In this example, the environment 100 includes a reputation data processing system 102. The reputation data processing system 102 may be one or more computer systems collectively configured to operate in accordance with various embodiments of the present disclosure, such as those embodiments discussed below. An example of such computer system is described below in connection with FIG. 11. In the illustrative example of FIG. 1, the reputation data processing system is configured to obtain data from external data sources 104 and internal data sources 106.

The reputation data processing system 102 may be operated by an organization or on behalf of the organization. As such, external data sources 104 may be computer systems serving as a source of data where the computer systems are operated by and/or on behalf of entities different from the organization. Similarly, internal data sources 106 may be computer systems serving as sources of data where the computer systems are operated by and/or on behalf of the organization. It should be noted that the various data sources, internal and external, may be hosted in various ways. For example, one or more of the internal data sources may be hosted by the organization itself, such as in a data center or other facility of the organization. One or more of the internal data sources may be hosted by third parties. For example, one or more of the internal data sources may operate using facilities and hardware of a third party, yet may be programmatically managed by or on behalf of the organization. The hosting of external data sources may also vary in these ways.

Turning to the external data sources, example data sources include social network systems 108. A social networking system may be a publicly accessible computer system having users from the general public. The term "computer system," unless otherwise contradicted explicitly or by context, is intended to encompass both single computer instances (e.g. a single server) and multiple computer system instances, such as a network of computer system instances that collectively operate to achieve a result. Further, a computer system may also encompass multiple computer system instances that span multiple geographic regions and/or data center facilities. Returning to an example social networking system 108, the users of the social networking system may have accounts and corresponding profiles with the social network systems 108 and may engage in social networking activities. Example social networking activities include communicating electronically with other users of a social network system, either privately or publicly, expressing interest in content, and/or associating profiles with other profiles of the social network system which may be pursuant to mutual acceptance of the association by corresponding users. Specific examples of social networking systems include Facebook®, Twitter®, MySpace®, and others. Some specific examples of social networking activities in the Facebook social network system include friending other users, posting content on another's wall, liking content and/or other users, public or private messaging, un-friending other users, sharing content, and other activities. Example activities in the Twitter social network system include following other users, being followed by other users, tweeting, re-tweeting, and the like.

Generally, any suitable external data source may be used in accordance with various embodiments of the present disclosure. For example, as illustrated in FIG. 1, various websites 110 with user-influenced content may also serve as external data sources for the reputation data processing system 102. A website with user-influenced content may be any public information resource in which content is associated with users of the website. An example website may be an online forum in which users of the forum submit messages for other users to see. Another example of a suitable website is an electronic marketplace in which users of the electronic marketplace are able to electronically provide feedback for other users of the electronic marketplace. For example, one user may purchase a product or otherwise have knowledge of the product and may provide an electronic review of the product for other users to see in connection with their purchasing decisions.

As with external data sources 104, internal data sources 106 may comprise one or more computer systems serving as an internal source of data for the reputation data processing system 102. Typically, organizations utilize various computer systems in connection with management of their operations. An organization, for example, may utilize various computer systems for accounting, human resources, talent management, customer relationship management, internal social networking, internal information sources (e.g. internal websites), and the like. FIG. 1 shows some illustrative examples of suitable internal data sources 106 in accordance with an embodiment. For example, as shown in FIG. 1, the internal data sources 106 include a human resource management system 112 which may be a computer system configured to perform various operations in connection with management of an organization's human resource needs.

The human resource management 112 may, for example, maintain data about employees of the organization and may allow administrators to update, add, and/or remove data for employees of the organization as the set of employees of the organization changes over time. Another example of a suitable internal data source 106 is a defect and enhancement request tracking system 114. A defect and enhancement request tracking system 114 may be a computer system which tracks various issues with products and/or services of the organization. For example, if the organization is a software company, the defect and enhancement request tracking system may enable employees to submit information identifying issues with the software otherwise known as bugs. The defect and enhancement request tracking system may also enable employees to submit information regarding bugs of internal computer systems used by the organization and not necessarily sold to others. For example, an employee may notice a broken link on an internal web page of the organization and, as a result, may submit a ticket which may then be processed by another employee of the organization who may update the internal website accordingly.

As illustrated in FIG. 1, the internal data sources also include an internal social network system 116. The internal social network system 116 may not be publicly accessible. That is, the universe of users of the internal social network system 116 may be limited, such as to employees of the organization, certain employees of the organization and/or individuals and/or computer systems to which the organization has provided authorization. As an example, the internal social network system 116 may be accessible to employees of the organization and certain vendors of the organization such as attorneys working in law firms for the organization. It should be noted and understood that, while referred to here as an "internal" social network system, this system may or may not be hosted internally. That is, it may actually be a hosted outside the company, but have a limited universe of employees, i.e., accessible by internal people.

Also as illustrated in FIG. 1, the internal data sources 106 include a talent management system 118. A talent management system may be a computer system configured to enable employees of the organization to perform various operations in connection with ensuring that the organization has appropriate personnel. For example, an employee of the organization may utilize the talent management system to track individuals who are engaged in the hiring process of the organization and/or to locate candidates for open positions. The talent management system may maintain resumes, may perform automated processing of received resumes, and the like. Example talent management systems include those offered under the brand name Taleo. It should be noted and understood that this system might be hosted elsewhere, but would considered "internal" in the sense that only "internal" people have access to this system.

As noted above, numerous variations of the environment 100 are considered as being within the scope of the present disclosure. For example, while FIG. 1 shows various illustrative examples of external data sources 104 and internal data sources 106, numerous embodiments of the present disclosure may have more or fewer data sources than those explicitly illustrated.

Turning to the reputation data processing system 102, in an embodiment, the system includes multiple components. For example, as illustrated in FIG. 1, the reputation data processing system 102 includes a connector framework 120. The connector framework 120 of the reputation data processing system 102 may be a component (e.g. separate computer system instance(s) or programming module) configured to enable the reputation data processing system 102 to obtain data from the external data sources 104 and internal data sources 106. The connector framework 120 may, for example, operate according to programming logic that enables the connector framework 120 to obtain data from numerous different data sources and combine the data in a manner suitable for processing by the reputation data processing system such as described below.

For example, many of the external data sources 104 and/or internal data sources 106 may provide data that is organized in different ways. The connector framework 120 may include programming logic to extract data and store data from multiple sources in a common manner such as in accordance with a common data storage schema. The connector framework may obtain data from the various data sources in numerous ways. For example, in an embodiment, the connector framework is configured to obtain data from the various data sources according to application programming interfaces (APIs) of the various systems. For example, a social network system 108 may include an API for obtaining data available in the API. The connector framework may include programming logic for making API calls in a manner acceptable to the social network system. Different social network systems may have different APIs and the connector framework may be configured appropriately to obtain data from the different sources.

The connector framework 120 may also be configured to obtain data in other ways. For example, data posted on web pages may be obtained by downloading web pages or other documents of the data source. For instance, a website may correspond to a domain name. The connector framework 120 may enable the reputation data processing system to obtain a web page or other document by using the URL. The connector framework may analyze and receive documents and store data accordingly. The connector framework 120 may also utilize various screen scraping techniques and generally any technique in which data from a data source may be obtained.

As noted above, the connector framework 120 in an embodiment enables the reputation data processing system to obtain data from various different sources and store the data according to a common schema or generally in a manner suitable for use by the reputation data processing system. In an embodiment as illustrated in FIG. 1, the data received through the connector framework 120 is stored by the reputation data processing system into a reputation database 122. The reputation database may be any data storage mechanism that enables the reputation data processing system to operate in accordance with the various embodiments described herein.

The reputation database may, for example, be a relational database comprising a computer system that utilizes storage to store data in multiple tables, where the tables associate some of the data with other data. For example a table may associate an identifier of an employee with data collected about the employee, such as data regarding the employee's activity in a social network and/or other electronic environment. According to some embodiments, much of the collected data can be stored in a triple-store (aka a graph database) and the remainder in a relational database. In such a mixed model, data can be stored based on how it will be analyzed later, i.e., it can be stored where future analysis will be most efficient. Once data is obtained from multiple sources and stored in the reputation database 122, a reasoner 124 of the reputation data processing system may process data accessed from the reputation database 122. The reasoner accordingly may be a component of the reputation data processing system that is configured to analyze data from the reputation database in accordance with the various embodiments described herein.

The reasoner 124 may, for example, analyze data from the reputation database 122 in order to determine an individual influence based on the data that was obtained about the individual. Similarly, the reasoner 124 may be used to decide which data is stored persistently in the reputation database 122. For example, the connector framework 120 in an embodiment may obtain more data than is necessary and/or desirable for use in accordance with the various embodiments. The reasoner 124 may accordingly analyze data to determine whether to discard the data or store the data in the reputation database 122.

In an embodiment, the environment 100 includes a reputation management user interface 126, which enables users of the reputation data processing system 102 to engage in various activities, such as by defining data analysis for the data processing system 102 to perform, specifying data sources and which data is to be obtained from the specified data sources, specifying parameters for maintaining data (e.g. how much data to store for each user, how to determine which data to keep and which to discard, and the like), viewing presentations of data and results of analysis of the data by the reputation data processing system 102, generating white label applications for data sources, and other activities. In an embodiment, the reputation management user interface 126 is an application operating on a computer system instance separate from the reputation data processing system 102, obtaining data for presentations and/or the presentations themselves from the reputation data processing system 102. The reputation management user interface 126 may be an application constructed using application development framework (ADF) tools, such as those available from Oracle Corporation. However, the reputation management user interface 126 may be any suitable application and, in some embodiments, the reputation management user interface is presented in a web browser, presenting presentations obtained from a web server of the reputation data processing system 102 (e.g. in the form of HTML pages). Also, while illustrated separately from the reputation data processing system 102, the reputation management user interface 126 may be a component of the reputation data processing system 102. For example, if the reputation data processing system is operated as a server or cluster of servers, the reputation management user interface 126 may be a module of the reputation data processing system 102 implemented by the server and/or one or more of the servers of the cluster.

The reputation management user interface 126 may also be separate from the reputation data processing system 102. For instance, the reputation management user interface 126 may be implemented by a server different from a server or cluster of servers that implements the reputation data processing system 102. Similarly, the reputation management user interface may be implemented as multiple components implemented themselves on different hardware devices. For example, the reputation management user interface 126 may be implemented collectively by a server and a client application executing on a hardware device of a user of the reputation management user interface 126. In an embodiment, the reputation management user interface enables users to view presentations of data and results of analysis of the data.

In an embodiment, the presentations presented by the reputation management user interface 126 include graphics and/or text which provide intuitive views of data in the reputation database and/or results of analysis of that data. In an embodiment, a user of the reputation management user interface provides user input that is transmitted to the reputation data processing system 102. The reasoner 124 may then process data from the reputation database 122 in accordance with the user input. Results of processing by the reasoner 124 may be provided to the reputation management user interface 126 for presentation to the user. Similarly, input by the user may be transmitted to the reputation data processing system 102 which may submit a query to the reputation database 122 to obtain data stored by the reputation database 122 which is then provided either directly or in a processed form to the reputation management user interface 126 for presentation to the user.

User input into the reputation management user interface 126 may also cause results from the reasoner 124 and data from the reputation database 122 to be provided for presentation to the user. Plus, in general, in an embodiment, the representation management user interface enables users to direct operation of the reputation data processing system 102 in accordance with its programmed capabilities. Additional capabilities may include, for example, obtaining data from a data source in response to user input provided to the reputation management user interface 126.

In various embodiments, the reputation management user interface 126 includes one or more additional features. For example, in an embodiment, the reputation management user interface 126 includes reusable ADF and/or API components that allow others to build additional applications that make use of data and analysis through the reputation data processing system 102. Reputation metrics and other values calculated by the reputation data processing system 102 may be used, for instance, to serve other purposes in addition to those described explicitly herein. For instance, reusable ADF components of the user interface 126 may be used to build a custom application for a marketing department to enable users in the marketing department to hone their skills and view how their activities serve their reputations and the reputations of the organization as well as how their activities may cause undue risk to the organization.

As another example, in some embodiments, the reputation management user interface 126 includes functionality to generate white label applications for one or more social networking systems and/or other system. A white label application built for a social network system may, for example, be installed by a user as a condition for receiving one or more rewards or other recognition. An example of such rewards may be a restaurant or retailer discounts. In such cases, if an employee shares more information, they may, in some embodiments, receive larger discounts, discounts at a larger set of retailers, or unlock extra coupon codes. Once installed, the white label application may give the organization access to information maintained by the social network system in a non-public manner. For example, using Facebook as an example, use of the white label application may give the organization access to information that is not accessible to the general public, but to a more limited group of Facebook users, such as those identified as friends of the user that installed the white label application. In an embodiment, the white label application allows the user to specify various privacy settings that determine how much and which types of information are shared with the organization. In some embodiments, the white label application is a wrapper for a benefit management application such that benefits to the employee may vary according to the amount of information shared by the employee. In this manner, the employee can choose the level of benefits and information sharing that he or she is most comfortable with.

Figure 2:
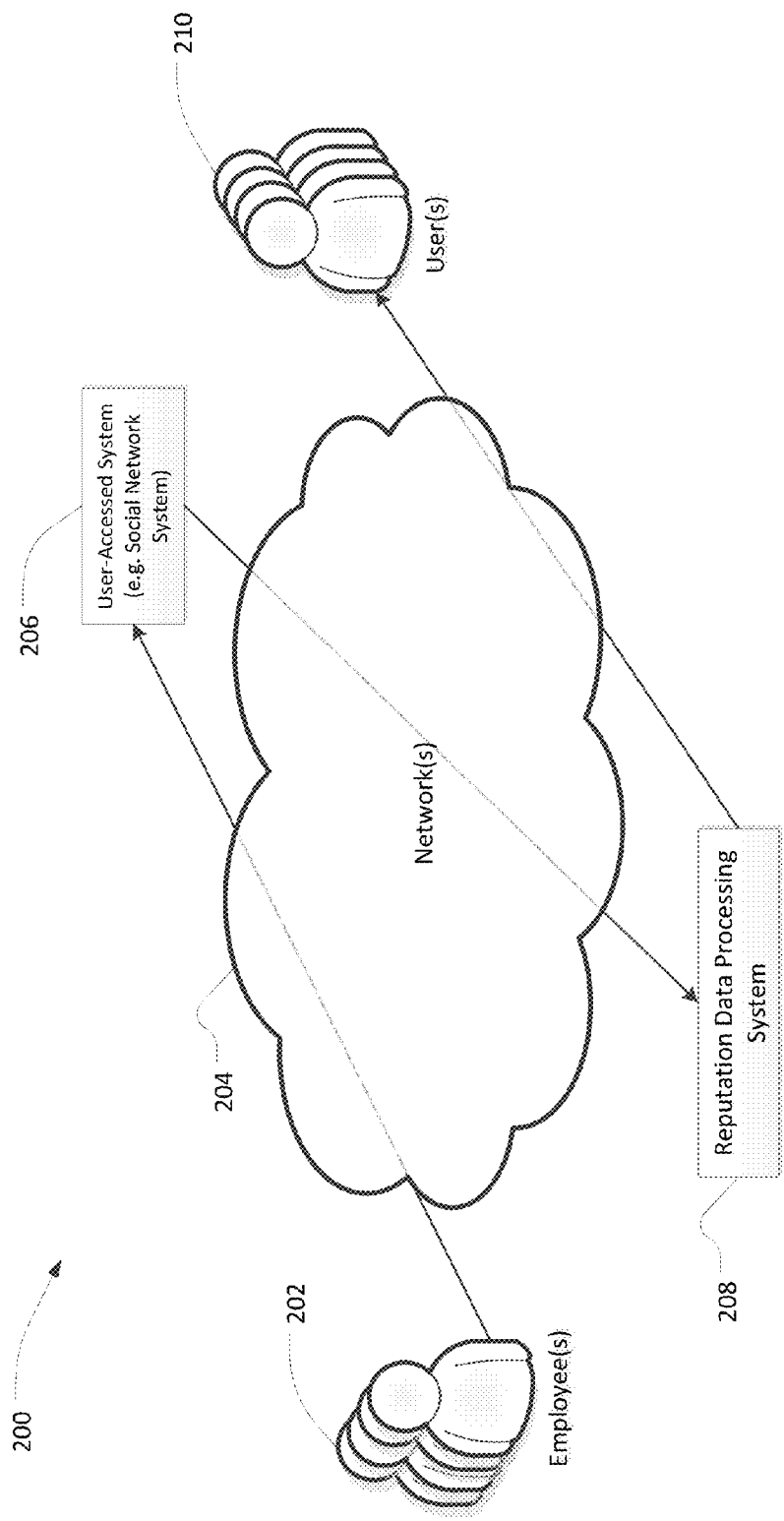
FIG. 2 shows an alternative illustrative example of the environment of FIG. 1 in which various embodiments of the present disclosure may be practiced.

FIG. 2 shows an illustrative example of an environment 200 in which various embodiments of the present disclosure may be performed. Environment 200 may be the environment 100 described above in connection with FIG. 1 or another environment. In the environment 200, employees 202 of an organization utilize one or more networks 204 to access a user-accessed system 206. The network 204 may be the Internet and an intranet, a mobile communications network and generally any suitable communications network or combination of networks. User-accessed system 206 may be an internal or external data source such as described above. For example, in an embodiment the user-accessed system may be a social network system.

The employees 202 of the organization may access the user-accessed system using various devices. Example devices include: personal computer systems, mobile devices such as smart phones, tablet computing devices and generally any device configured to communicate with the user-accessed system 206. As shown in FIG. 2, a reputation data processing system 208, such as the reputation data processing system described above in connection with FIG. 1, obtains data from the user-accessed system 206. For example, the reputation data processing system 208 may submit an API call to the user-accessed system 206 which may provide a response accordingly with data specified by the API call.

For example, the reputation data processing system 208 in an embodiment may submit an API call to obtain data about an employee 202 specified in the API call. The API call may, for example, specify a user name utilized by the employee when accessing the user-accessed system 206. Accordingly, the reputation data processing system 208 in an embodiment may maintain data that associates internal identifiers of employees with corresponding user names of the user-accessed system 206. It should be noted, however, that the reputation data processing system and the user-accessed system may utilize the same identifier for a single employee. For example, the user-accessed system may be an internal system of the organization and a single identifier may be used by the reputation data processing system 208 and the user-accessed system 206.

As noted above, the reputation data processing system 208 may obtain data from the user-accessed system 206 in other ways such as by requesting a web page of the user-accessed system 206 and processing data from the web page accordingly. In another example, the reputation data processing system may request data in batches. For example, the organization may maintain an account with the user-accessed system 206. The reputation data processing system 208 may then, for example, submit an API call requesting current data for the account such as data for all employees of the organization having an account with the user-accessed system 206. Generally, the reputation data processing system 208 may obtain data from the user-accessed system 206 in any suitable manner including in manners not explicitly described herein. In addition, the data processing system may determine which received data to store in a persistent manner.

Data that has been stored and/or processed by the reputation data processing system 208 may be accessed by users 210 of the organization and/or users acting on behalf of the organization. Such users may be users interested in compliance of the organization, reputation of the organization and hiring for the organization and/or generally any users who utilize the reputation data processing system as part of their activities. Users may access the reputation data processing system through a browser or other application configured to submit requests for presentations of data to the reputation data processing system 208 which may then provide appropriate responses to the users.

Figure 3:
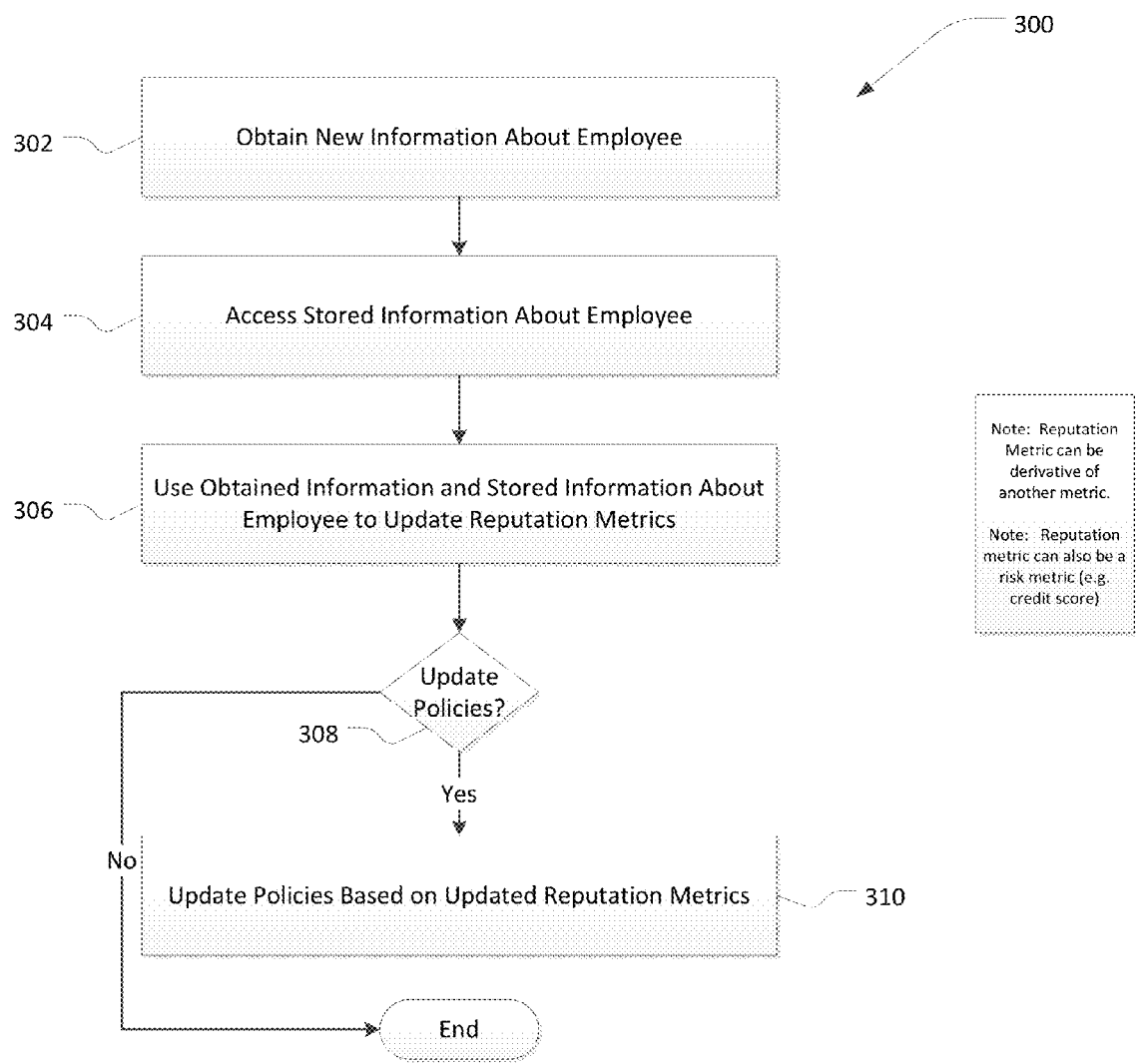
FIG. 3 shows example steps of a process for addressing risk in an organization in accordance with at least one embodiment.

FIG. 3 accordingly shows an illustrative example of a process 300 which may be used to manage policies in connection with an employee in accordance with various embodiments. The process 300 may be performed, for example, by a reputation data processing system such as described above. Some or all of the process 300 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 300, in an embodiment, includes obtaining 302 new information about an employee. For example, additional information may be obtained from an external and/or an internal data source, such as in the manner described above. The new information may be, for instance, one or more Facebook posts, one or more tweets in the Twitter social network, one or more posts on LinkedIn, a credit score, information about criminal proceedings (e.g., an arrest record from an electronic service), an updated background check record from a background check service, and/or other information posted by or about the employee. Similarly, stored information about the employee may be accessed 304, that is, data may have been accessed using the techniques described above and stored and new information may have been generated, such as if the employee has been updating his or her social network accounts. The stored information may be, for example, information that is stored in a reputation database, such as described above, and/or information from one or more internal data sources.

The obtained information and stored information about the employee may be used 306 to update one or more reputation metrics for the employee. The reputation metrics may be values calculated based on the data that indicate something about the employee. The reputation metrics can indicate, for example, influence of the employee and/or risk of the employee. Example reputation metrics relating to impact and/or influence include generosity, influence, engagement, activity, impact and clout.

Generosity may be a reputation metric calculated based at least in part on a relative number of times the employee makes an effort to promote content of another. Examples of efforts to promote the content of another include sharing, in a social network (e.g. Facebook, LinkedIn), content posted by another, re-tweeting a tweet in the Twitter social network, and otherwise taking action that promotes something of another. Generosity may be a relative value and, therefore, may be dependent on the actions of others. Generosity for an employee may be, for instance, calculated relative to other employees in a group, such as the whole organization, a department, employees sharing one or more characteristics (e.g. job title), and/or the like.

Influence, in an embodiment, is a reputation metric that indicates, in a relative manner, how often others promote the content of the employee. The influence value may be, for example, based on the number of tweets of the employee that are re-tweeted in the Twitter social network, the number of posts or other content of the employee that are shared in the Facebook social network, and/or other actions taken by others with respect to content associated with the employee. As with the generosity value and other values herein, the value may be calculated relative to a defined universe of users, which may or may not be limited to users of the organization.

Engagement, in an embodiment, is a reputation metric calculated based at least in part on actions taken by the employee that indicate engagement with others. Examples include commenting on content posted by others in various social networks, clicks on articles posted by others (to indicate having read the articles), and/or other actions determined to correspond to engagement by the employee.

Activity, in an embodiment, is a reputation metric that is calculated to be a relative value that is based at least in part on the number of times the employee posts content in one or more social networks relative to other users in some defined universe of users. The impact box may be, for instance, calculated based at least in part on the influence reputation metric and additionally based at least in part on the size of the employee's social network. For example, the impact value may be based at least in part on the number of followers of the employee in the Twitter social network and at least in part on the number of times a follower re-tweets tweets of the employee. Thus, the impact value may be a relative value that increases both with increased social network size or increased activity of others in connection with content posted by the employee.

Clout, in an embodiment, is a reputation metric that is calculated using search engine metrics. In particular, search histories of users in a defined universe of users may be obtained to determine the frequency at which content of the employee appears in search results responsive to search queries submitted by others. The appearance of such content in search response rankings may also be used. Thus, the clout reputation metric, in an embodiment, corresponds to the clout of an employee as measured by the appearance of the employee's content in search responses. As with generosity and other metrics discussed above, this value may be calculated relative to a defined group of employees. Further, the search engines may be operated by third parties.

While the above example reputation metrics may be used in calculations of risk (e.g. an employee with higher influence and/or clout may cause more damage by a violation of an organizational policy), other reputation metrics relate more directly to risk of an organization. Example reputation metrics are "no profanity," disparagement, disclaimer use, confidentiality respect, reference respect and future offerings are provided. The "no profanity" reputation metric may be based at least in part on a profanity value that is calculated based at least in part on the number of posts of content by the employee and the number of those posts that contain a word considered to be profane. (Unless otherwise clear from context, post herein is to be understood generally as, and includes activity such as, tweets and other activity of making content available.) Whether a word is profane may be determined, for instance, by searching the content of the employee for words on a list of profane words. The "no profanity" metric may be calculated as (or may be at least based at least in part on) the ratio of posts of the employee containing profanity to the total number of posts of the employee. As with other metrics, posts may be calculated with respect to one or more social networks or other information sources.

The "non-disparagement" reputation metric, in an embodiment, corresponds to a disparagement value. The disparagement value may be calculated similar to the "no profanity" value, but instead of posts containing profanity being used, posts containing disparaging words and/or phrases are used. Determining whether a post contains disparaging words and/or phrases may be performed using semantic analysis of the posts, for instance by stemming words in the posts and searching for similar words in the same semantic topics. In other words, determining whether the posts contain disparaging words and/or phrases may be performed by determining whether the posts contain phrases that are semantically similar to known disparaging words and/or phrases.

The "use disclaimer" reputation metric, in an embodiment, corresponds to a measure of activity relating to an employee's web log (blog), if the employee has a blog, and/or other electronic environment managed by the employee. An organization's social media policy may, for example, require bloggers that are also employees to make clear that the opinions expressed in the blog are not necessarily those of the organization. The employee may be required, for example, to include a predetermined disclaimer in each blog post and/or in a "terms and conditions" or other portion of a web site. The "use disclaimer" reputation metric, therefore, in an embodiment, may correspond to a value that is calculated based at least in part on the number of blog posts and the number of blog posts analyzed and calculated to lack the required disclaimer.

The "respect confidentiality" reputation metric, in an embodiment, as with other boxes, corresponds to a measure of certain activity calculated to contain one or more issues. In this instance, an issue is an instance of a post that, either inadvertently or intentionally, contains information that should be confidential. For example, posts containing the name of a company in which the organization is in confidential merger discussions may be marked as issue posts. Similarly, posts containing information about a future product release may be marked as issue posts. Determining whether a post contains confidential information may be performed by searching the posts for keywords of a list of keywords corresponding to confidential information. Such lists may be maintained by one or more individuals tasked with maintaining the organization's confidentiality. In addition, steps to obscure the terms from an administrator (e.g. user of the UI shown in FIG. 6) may be taken. For example, the administrator may be provided a list with dummy words and/or phrases. A reputation data processing system may convert the dummy words/phrases to actual words/phrases outside of the view of the administrator. Other ways of obscuring confidential information may also be used. Activities that may be examined for issues may include posts, articles, tweets, and/or generally any information made available to an unauthorized audience (e.g. the public and/or even those without authorization within the same organization).

The "respect references" reputation metric, in an embodiment, is also a value calculated based at least in part on a total number of posts and a number of those posts determined to contain one or more issues. In this example, a post may be considered to contain an issue if it lacks proper attribution and/or respects brand names. For example, a post may be considered to contain an issue by searching for a phrase of a predetermined minimum length and submitting the phrase to a search engine to determine whether the phrase is original. As another example, a post may be considered to contain an issue if the post includes a trademark without use of the trademark symbol ® or ™.

The "future offerings" reputation metric may be similarly generated based at least in part on the number of posts and the number of posts determined to contain one or more particular issues. A post may be determined to contain an issue if the post contains information about a future product offering that is intended to remain confidential. The "future offerings" reputation may be calculated similar to the "respect confidentiality" box, but generated also where the issues are limited to those dealing with future product offerings.

Returning to the process 200, a determination may be made 308, based at least in part on the reputation metrics, whether or not to update policies are applicable to the employee. If it is determined 308 to update the policies, then the policies are updated 310 in accordance with the updated reputation metrics. Similarly, if it is determined 308 not to update the policies, then no additional action may be taken or action different from that which is illustrated in FIG. 3 may be taken. Determination 308 whether to update one or more policies may be performed by any suitable manner. For example, one or more reputation metrics may be used to calculate a risk score. Changes to the risk score that exceed a threshold amount may result in positive determinations to update the policies. In addition, a determination of whether to update policies may be made based at least in part on a numerical estimate of a derivative of one or more reputation metrics and/or a score calculated based at least in part on one or more reputation metrics. For instance, exceeding a threshold value of a derivative of a metric corresponding to risk may result in a positive determination to update one or more policies since the derivative exceeding the threshold value may indicate a sudden increase in risk.

According to one embodiment, a mixed-model approach can be used in determining 308 whether to update 310 policies or take other actions related to a reputation. In implementations under such a model, the determination 308 can be made using the internal reputation scores (those calculated based on the sources described above), externally calculated reputation scores provided by third-party sources, and/or other types of scores like credit scores, in combination so that a decision can be made about a user's level of access to program features and/or data-level access.

In addition, while not illustrated as such, additional actions may also be performed in connection with the process 300 and/or variations thereof. For example, determining whether to update one or more policies and updating one or more policies may be performed as an automated process, where policies are updated automatically upon detection of triggering events, and/or may be performed with additional user intervention. For example, updated reputation metrics may be used to generate a presentation to a user on a user interface and/or an electronic message to the user. The user may be, for instance, an administrator monitoring organizational reputation and/or compliance of an organization. The presentation and/or electronic message may indicate the change in risk. The user, through a user interface, may investigate the circumstances and reasons for the change in risk and may make a determination whether to update one or more policies. If the user determines to update one or more policies, the user may provide user input through the interface that updates one or more policies accordingly. One or more electronic messages may then be sent to one or more computer systems that are configured to enforce policies. For example, a message to a computer system may trigger the computer system to change a set of privileges of the employee for whom the increased risk was calculated. The computer system may, for instance, prohibit the employee from engaging in certain transactions that he or she was previously able to engage in.

Further, updating policies may also be performed in a manner that increases the amount of activities in which employees are allowed to engage. For instance, increases in reputation metrics and/or scores that indicate positive (i.e. beneficial) changes may result in policies being updated to enable the employee to engage in a wider set of activities. For instance, if changes indicate that the employee is more influential and low risk, the employee may be allowed to engage in more public activity on behalf of the employee. Similarly, employees whose risk decreases may be allowed to use the organization's computer systems to engage in more activities, thereby enabling the employee to more effectively and freely serve the organization with less additional risk to the organization.

Figure 4:
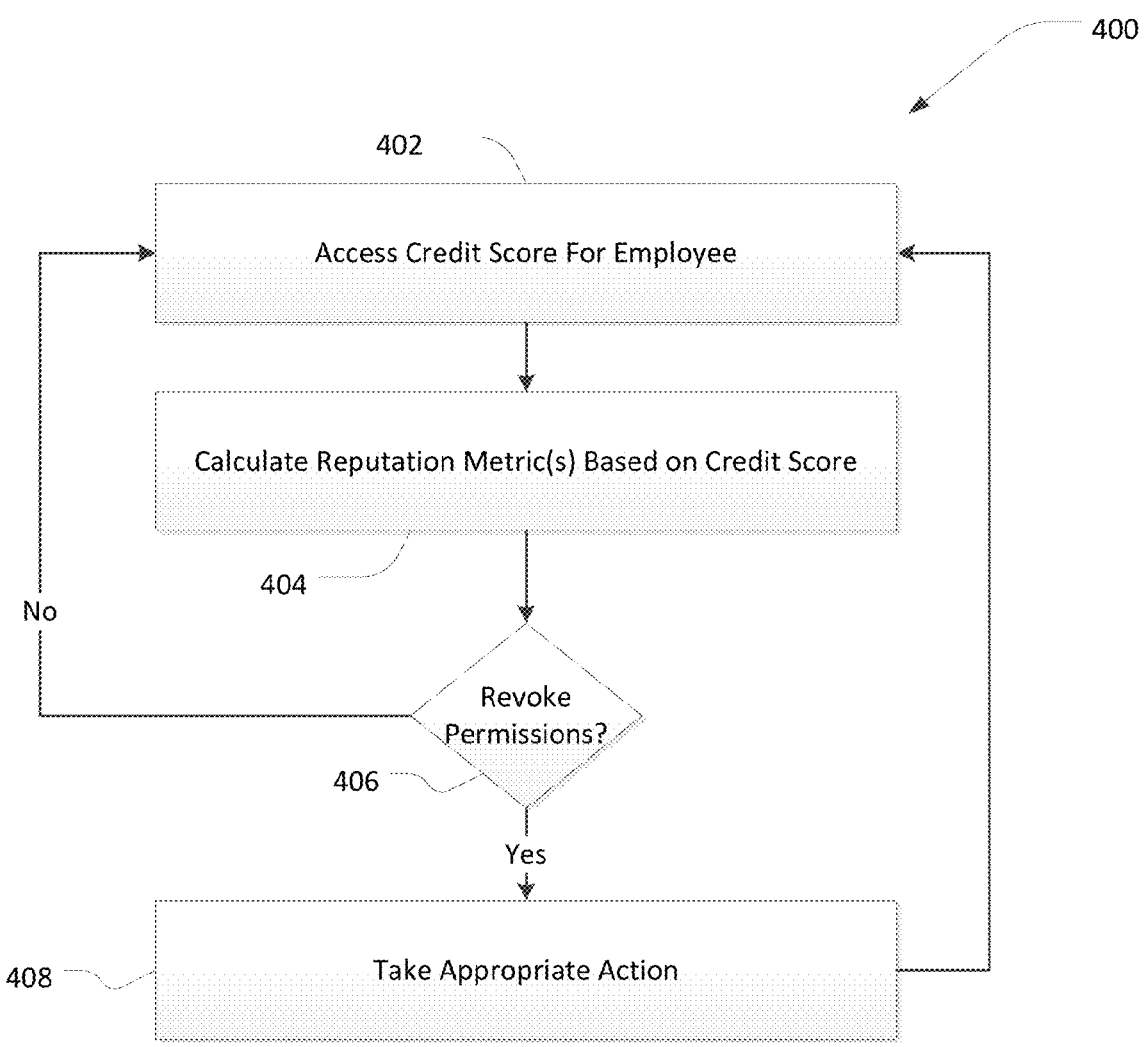
FIG. 4 shows example steps of another process for addressing risk in an organization in accordance with at least one embodiment.

FIG. 4 shows an illustrative example of a specific instance in which the process 300 may be performed and, in particular, how credit scores of employees may be used to calculate. In particular, FIG. 4 shows an illustrative example of a process 400 for updating policies based at least in part on an employee's changing credit score. For example, in an embodiment the process 400 includes accessing 402 the credit score for the employee. Accessing this credit score may be done in any suitable manner. For example, accessing the credit score may be done by obtaining the credit score from a database in which the credit score is stored. Similarly, accessing the credit score for the employee may be performed by receiving the credit score from an external data source which collects and vends credit scores for individuals. One or more reputation metrics (and/or reputation scores based at least in part on one or more reputation metrics) may be calculated 404 based at least in part on the accessed credit score.

Other information may also be used to calculate the reputation metric such as described above. A determination may then be made 406 whether or not to revoke permissions, such as described above in connection with determinations to update one or more policies. The determination may be made based at least in part on the calculated one or more reputation metrics. If it is determined to revoke the permissions, then appropriate action may be taken.

For example, an electronic message may be sent to a specified individual of the organization to notify the individual of the change in reputation metrics. That individual may then reconfigure one or more computer systems of the organization to prohibit the employee from taking certain actions, such as by prohibiting the employee from engaging in certain financial transactions. The appropriate action may also include automatically reconfiguring the one or more configured computer systems, such as by transmitting an electronic message to the computer systems that indicates to the computer systems upon receipt of the electronic communication to update themselves. Generally, any action which may be relevant to one or more individuals may be taken.

Figure 5:
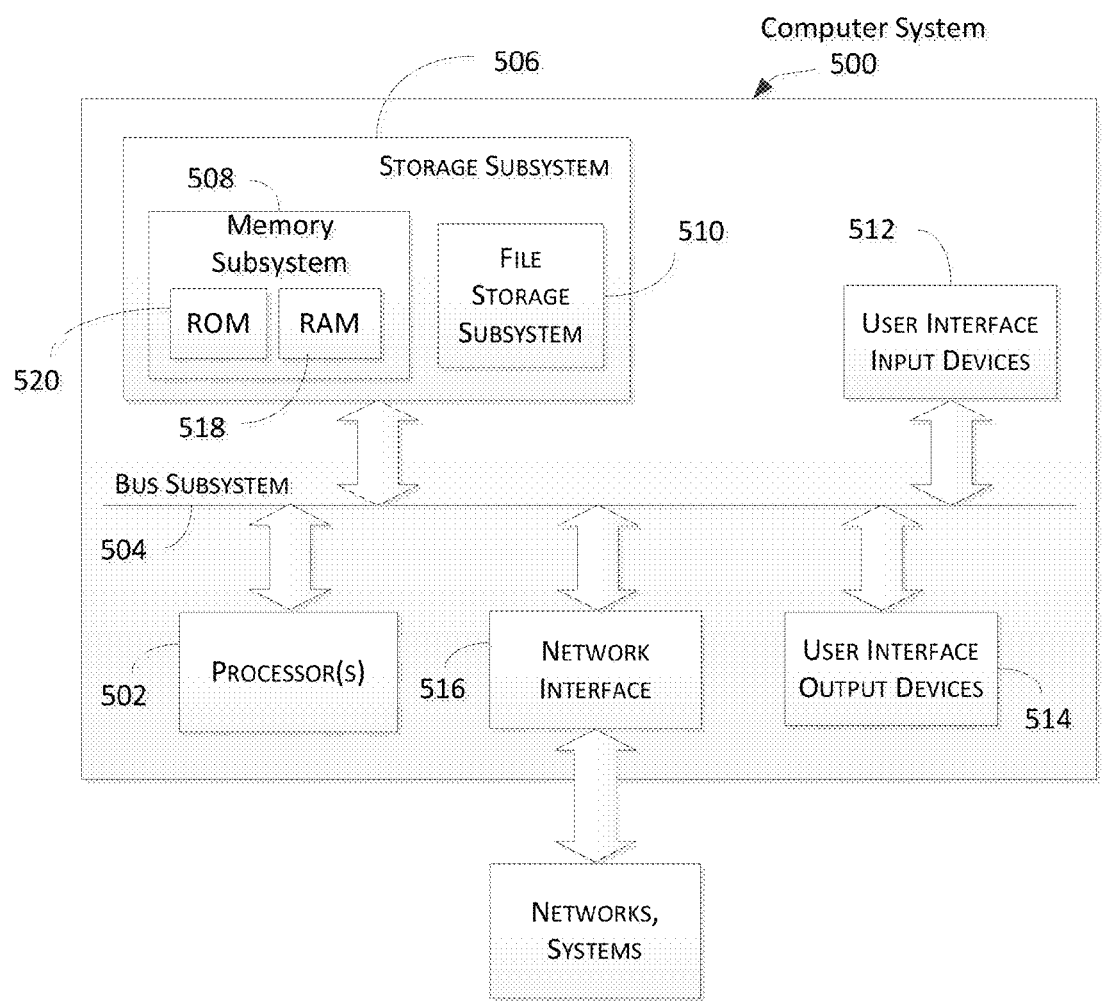
FIG. 5 shows an example computer system that may be used to implement various aspects of the present disclosure.

FIG. 5 is a simplified block diagram of a computer system 500 that may be used to practice an embodiment of the present invention. Computer system 500 may serve as a reputation data processing system, or component computer system instance thereof, such as described above and/or a computer system that presents a user interface in accordance with the various embodiments described herein. As shown in FIG. 5, computer system 500 includes a processor 502 that communicates with a number of peripheral subsystems via a bus subsystem 504. These peripheral subsystems may include a storage subsystem 506, comprising a memory subsystem 508 and a file storage subsystem 510, user interface input devices 512, user interface output devices 514, and a network interface subsystem 516.

Bus subsystem 504 provides a mechanism for letting the various components and subsystems of computer system 500 communicate with each other as intended. Although bus subsystem 504 is shown schematically as a single bus, alternative embodiments of the bus subsystem may utilize multiple busses.

Network interface subsystem 516 provides an interface to other computer systems, networks, and portals. Network interface subsystem 516 serves as an interface for receiving data from and transmitting data to other systems from computer system 500. The network interface subsystem 516, for example, may enable the computer system 500 to communicate with other computer systems over a network, such as to obtain data from various data sources and/or to communicate with other components of a reputation data processing system.

User interface input devices 512 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 500. A user may use an input device to provide user input to interact with a user interface to perform various activities described above.

User interface output devices 514 may include a display subsystem, a printer, a fax machine, or non-visual displays such as audio output devices, etc. The display subsystem may be a cathode ray tube (CRT), a flat-panel device such as a liquid crystal display (LCD), a light emitting diode (LED) display, a projection device, and/or another device capable of presenting information. In general, use of the term "output device" is intended to include all possible types of devices and mechanisms for outputting information from computer system 500. Presentations generated in accordance with the various embodiments described herein, for example, may be presented using output devices 514.

Storage subsystem 506 provides a computer-readable medium for storing the basic programming and data constructs that provide the functionality of the present invention. Software (programs, code modules, instructions) that, when executed by a processor, provide the functionality of the present invention may be stored in storage subsystem 506. These software modules or instructions may be executed by processor(s) 502. Storage subsystem 506 may also provide a repository for storing data used in accordance with the present invention, for example, the data stored in the diagnostic data repository. For example, storage subsystem 506 provides a storage medium for persisting data that is analyzed to calculate various reputation metrics and/or reputation values. Storage subsystem 506 may comprise memory subsystem 508 and file/disk storage subsystem 510.

Memory subsystem 508 may include a number of memory components including a main random access memory (RAM) 518 for storage of instructions and data during program execution and a read only memory (ROM) 520 in which fixed instructions are stored. File storage subsystem 510 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 500 can be of various types including a personal computer, a portable computer, a smartphone, a table computing device, a workstation, a network computer, a mainframe, a kiosk, a server or any other data processing system. Due to the ever-changing nature of computers and networks, the description of computer system 500 depicted in FIG. 5 is intended only as a specific example for purposes of illustrating the preferred embodiment of the computer system. Many other configurations having more or fewer components than the system depicted in FIG. 5 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method for managing one or more computer authorization policies of an enterprise based on electronic reputation auditing of employees of the enterprise, the method comprising:

obtaining electronic information associated with an employee of the enterprise from each of a plurality of electronic data sources, wherein the plurality of electronic data sources include at least one data source internal to the enterprise and at least one data source external to the enterprise;

accessing electronically stored reputation information for the employee, the reputation information including one or more reputation metrics, the one or more reputation metrics indicating an influence of the employee to be a risk to the enterprise associated with the employee;

updating the one or more reputation metrics for the employee based on the obtained electronic information;

via one or more computer processors selectively iterating;

calculating a risk score for the employee using the electronically stored one or more reputation metrics;

calculating a risk score for the employee using the updated one or more reputation metrics;

selectively determining to update the one or more computer authorization policies of the enterprise responsive to determining a change in the risk scores exceeds a predetermined threshold amount; and updating the one or more computer authorization policies of the enterprise based at least in part on the selectively determining, wherein the updating the one or more computer authorization policies comprises selectively increasing and selectively decreasing the employee's level of access to data and program features within the enterprise.

2. The method of claim 1, wherein selectively determining to update the one or more computer authorization policies of the enterprise comprises:

making a numerical estimate of a derivative of the risk score calculated using the electronically stored one or more reputation metrics and the risk score calculated using the updated one or more reputation metrics; and determining to update the one or more computer authorization policies of the enterprise when the numerical estimate of the derivative of the risk scores indicates a change in the risk scores that exceeds a threshold amount.

3. The method of claim 1, wherein selectively determining to update the one or more computer authorization policies of the enterprise comprises:

generating a user interface including an indication of a change in risk associated with the employee based on updating the one or more reputation metrics for the employee;

presenting the user interface to a user;

receiving from the user through the user interface an indication of an update to the one or more computer authorization policies of the enterprise; and updating the one or more computer authorization policies of the enterprise based at least in part on the received indication.

4. The method of claim 1, wherein selectively determining to update the one or more computer authorization policies of the enterprise comprises:

accessing a credit score of the employee; and calculating at least one of the one or more reputation metrics based on the credit score of the employee.

5. The method of claim 1, wherein selectively determining to update the one or more computer authorization policies of the enterprise comprises: increasing an amount of activities in which the employee is allowed to engage, when updating the one or more reputation metrics for the employee, based on the obtained information, results in an increase in the one or more reputation metrics.

6. The method of claim 1, wherein selectively determining to update the one or more computer authorization policies of the enterprise comprises: decreasing an amount of activities in which the employee is allowed to engage, when updating the one or more reputation metrics for the employee, based on the obtained information, results in a decrease in the one or more reputation metrics.

7. A system comprising:

a processor; and a memory coupled with and readable by the processor and storing therein a set of instructions which, when executed by the processor, causes the processor to manage one or more computer authorization policies of an enterprise based on electronic reputation auditing of employees of the enterprise by:

obtaining electronic information associated with an employee of the enterprise from each of a plurality of electronic data sources, wherein the plurality of electronic data sources include at least one data source internal to the enterprise and at least one data source external to the enterprise;

accessing electronically stored reputation information for the employee, the reputation information including one or more reputation metrics, the one or more reputation metrics indicating an influence of the employee to be a risk to the enterprise associated with the employee;

updating the one or more reputation metrics for the employee based on the obtained electronic information;

via one or more computer processors selectively iterating:

calculating a risk score for the employee using the electronically stored one or more reputation metrics:

calculating a risk score for the employee using the updated one or more reputation metrics:

selectively determining to update the one or more computer authorization policies of the enterprise responsive to determining a change in the risk scores exceeds a predetermined threshold amount; and updating the one or more computer authorization policies of the enterprise based at least in part on the selectively determining, wherein the updating the one or more computer authorization policies comprises selectively increasing and selectively decreasing the employee's level of access to data and program features within the enterprise.

8. The system of claim 7, wherein selectively determining to update the one or more computer authorization policies of the enterprise comprises:

making a numerical estimate of a derivative of the risk score calculated using the electronically stored one or more reputation metrics and the risk score calculated using the updated one or more reputation metrics; and determining to update the one or more computer authorization policies of the enterprise when the numerical estimate of the derivative of the risk scores indicates a change in the risk scores that exceeds a threshold amount.

9. The system of claim 7, wherein selectively determining to update the one or more computer authorization policies of the enterprise comprises:

generating a user interface including an indication of a change in risk associated with the employee based on updating the one or more reputation metrics for the employee;

presenting the user interface to a user;

receiving from the user through the user interface an indication of an update to the one or more computer authorization policies of the enterprise; and updating the one or more computer authorization policies of the enterprise based at least in part on the received indication.

10. The system of claim 7, wherein selectively determining to update the one or more computer authorization policies of the enterprise comprises:

accessing a credit score of the employee; and calculating at least one of the one or more reputation metrics based on the credit score of the employee.

11. The system of claim 7, wherein selectively determining to update the one or more computer authorization policies of the enterprise comprises: increasing an amount of activities in which the employee is allowed to engage, when updating the one or more reputation metrics for the employee, based on the obtained information, results in an increase in the one or more reputation metrics.

12. The system of claim 7, wherein selectively determining to update the one or more computer authorization policies of the enterprise comprises: decreasing an amount of activities in which the employee is allowed to engage, when updating the one or more reputation metrics for the employee, based on the obtained information, results in a decrease in the one or more reputation metrics.

13. A computer-readable memory comprising a set of instructions stored therein which, when executed by a processor, causes the processor to manage one or more computer authorization policies of an enterprise based on electronic reputation auditing of employees of the enterprise by:
    obtaining electronic information associated with an employee of the enterprise from each of a plurality of electronic data sources, wherein the plurality of electronic data sources include at least one data source internal to the enterprise and at least one data source external to the enterprise;
    accessing electronically stored reputation information for the employee, the reputation information including one or more reputation metrics, the one or more reputation metrics indicating an influence of the employee to be a risk to the enterprise associated with the employee;
    updating the one or more reputation metrics for the employee based on the obtained electronic information;
    via one or more computer processors selectively iterating:
    calculating a risk score for the employee using the electronically stored one or more reputation metrics;
    calculating a risk score for the employee using the updated one or more reputation metrics;
    selectively determining to update the one or more computer authorization policies of the enterprise responsive to determining a change in the risk scores exceeds a predetermined threshold amount; and
    updating the one or more computer authorization policies of the enterprise based at least in part on the selectively determining, wherein the updating the one or more computer authorization policies comprises selectively increasing and selectively decreasing the employee's level of access to data and program features within the enterprise.

14. The computer-readable memory of claim 13, wherein selectively determining to update the one or more computer authorization policies of the enterprise comprises:
    making a numerical estimate of a derivative of the risk score calculated using the electronically stored one or more reputation metrics and the risk score calculated using the updated one or more reputation metrics; and
    determining to update the one or more computer authorization policies of the enterprise when the numerical estimate of the derivative of the risk scores indicates a change in the risk scores that exceeds a threshold amount.

15. The computer-readable memory of claim 13, wherein selectively determining to update the one or more computer authorization policies of the enterprise comprises:
    generating a user interface including an indication of a change in risk associated with the employee based on updating the one or more reputation metrics for the employee;
    presenting the user interface to a user;
    receiving from the user through the user interface an indication of an update to the one or more computer authorization policies of the enterprise; and
    updating the one or more computer authorization policies of the enterprise based at least in part on the received indication.

16. The computer-readable memory of claim 13, wherein selectively determining to update the one or more computer authorization policies of the enterprise comprises:
    accessing a credit score of the employee; and
    calculating at least one of the one or more reputation metrics based on the credit score of the employee.

17. The computer-readable memory of claim 13, wherein selectively determining to update the one or more computer authorization policies of the enterprise comprises: increasing an amount of activities in which the employee is allowed to engage, when updating the one or more reputation metrics for the employee, based on the obtained information, results in an increase in the one or more reputation metrics.

* * * * *

UNITED STATES PATENT AND TRADEMARK OFFICE
CERTIFICATE OF CORRECTION

| | | |
|---|---|---|
| PATENT NO. | : 9,015,795 B2 | Page 1 of 1 |
| APPLICATION NO. | : 13/932265 | |
| DATED | : April 21, 2015 | |
| INVENTOR(S) | : Reza B'Far et al. | |

It is certified that error appears in the above-identified patent and that said Letters Patent is hereby corrected as shown below:

In the claims

Column 16, Claim 1, Line 67: Delete "iterating;" and insert --iterating:--

Column 18, Claim 7, Line 18: Delete "metrics:" and insert --metrics;--

Column 18, Claim 7, Line 20: Delete "metrics:" and insert --metrics;--

Column 19, Claim 12, Line 8: Delete "employee ," and insert --employee,--

Column 19, Claim 13, Line 32: Delete "metrics:" and insert --metrics;--

Column 19, Claim 13, Line 34: Delete "metrics:" and insert --metrics;--

Signed and Sealed this
Third Day of May, 2016

Michelle K. Lee
*Director of the United States Patent and Trademark Office*